PULSE AMPLITUDE MODULATION TO PULSE WIDTH MODULATION CONVERTER

Filed May 6, 1965

Inventors
GEORGE F. CRAVEN
JOHN S. HEEKS
ALAN D. WOODE
By [signature]
Attorney

United States Patent Office 3,422,364

Patented Jan. 14, 1969

3,422,364

PULSE AMPLITUDE MODULATION TO PULSE WIDTH MODULATION CONVERTER

George Frederick Craven, John Stuart Heeks, and Alan David Woode, London, England, assignors to International Standard Electric Corporation, New York, N.Y., a corporation of Delaware Filed May 6, 1965, Ser. No. 453,666

Claims priority, application Great Britain, May 15, 1964, 20,313/64

U.S. Cl. 329—106 9 Claims

Int. Cl. H03k 9/08; H03d 9/02; H03k 5/20

ABSTRACT OF THE DISCLOSURE

The converter described comprises a section of coaxial line in which the center conductor includes a step recovery diode coupled in series with a disc resistor connecting the center conductor to the outer conductor. An input pulse amplitude modulation signal causes forward current to flow in the diode. On termination of the input signal, reverse current flows in the diode for a time proportional to the magnitude of forward current resulting in an output pulse width modulation signal which is present across the resistor.

Figures 1, 2A, 2B, 3:
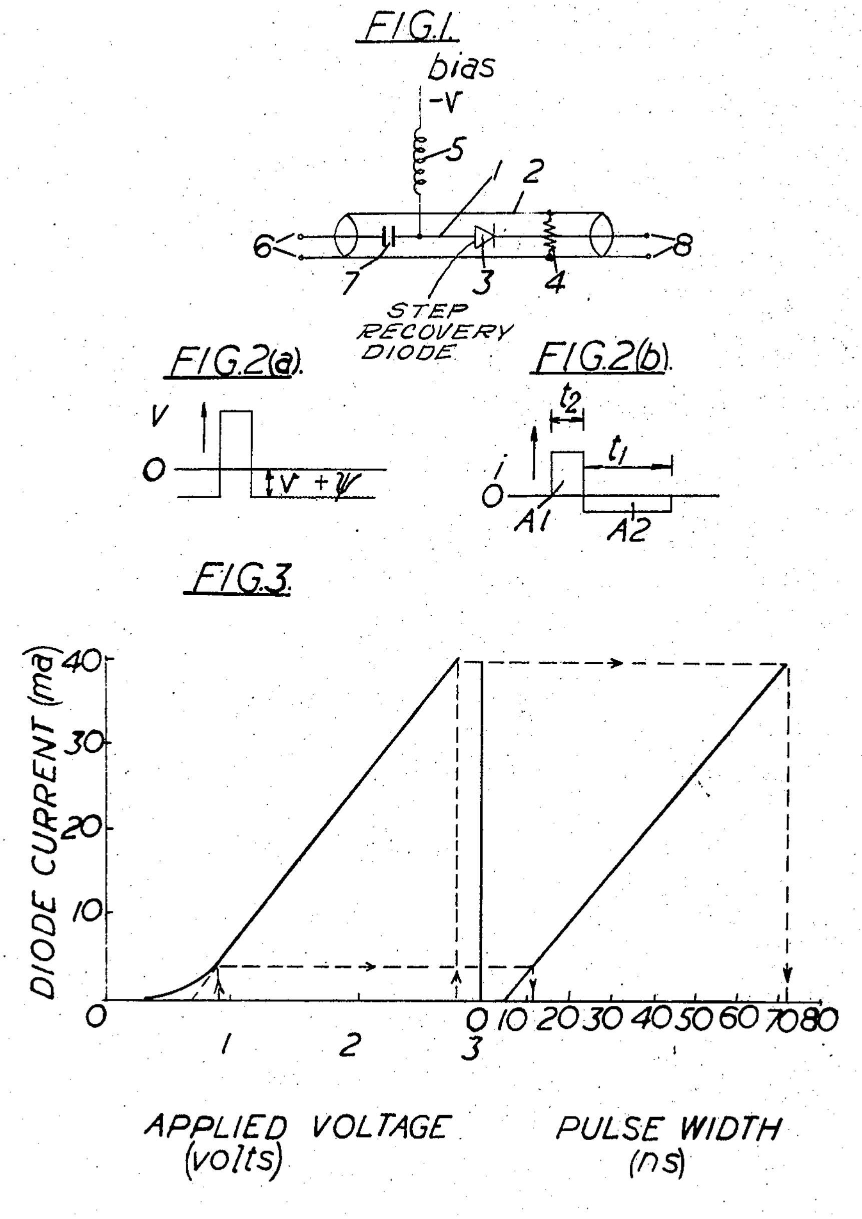

This invention relates to a PAM (pulse amplitude modulation) to PWM (pulse width modulation) signal converter.

Known methods of converting PAM to PWM involve the use of a linear sawtooth waveform with an amplitude discriminating device. The difficulties involved in obtaining a linear sawtooth waveform at high frequencies limit such methods to below about 10 mc./s.

An object of the invention is to achieve conversion directly and at sampling rates in the region of 10–100 mc./s.

According to the invention there is provided a PAM to PWM signal converter comprising a pair of input terminals, a step recovery diode and a resistance connected in series between said input terminals, and a pair of output terminals connected across said resistor.

The invention uses three unique properties of the so-called step recovery diode ("P=N Junction Charge-Storage Diodes," Proc. I.R.E., vol. 50, No. 1, January 1962, p. 43) namely, (1) a tendency to infinite capacitance in the forward direction (zero incremental voltage drop), (2) charge conservation in a cyclic sequence of injection and recovery takes place in a time which is short compared to the minority carrier lifetime in the diode, and (3) under constant reverse bias charge flows out of the diode at a uniform rate terminating in a fast return to zero current when all the charge is removed.

The invention will now be described with reference to the accompanying drawings, in which:

FIG. 1 shows a PAM to PWM converter embodying the invention;

FIGS. 2*a* and 2*b* are waveforms illustrating the action of the converter;

FIG. 3 show characteristics of a step recovery diode.

Referring to FIG. 1, the inner conductor 1 of a section of co-axial line having a characteristic impedance of 50 ohms is connected to the outer conductor 2 via a step recovery diode 3 in series with a 50 ohm disk resistor 4.

A reverse bias of $-v$ volts is applied to the diode 3 via a signal isolating inductance 5.

Input PAM signals are applied to the line across terminals 6 and via a capacitor 7, and output PWM signals are taken across the resistor 4 via terminals 8.

In response to a PAM signal pulse of voltage V, FIG.

2*a*, forward current flows through the diod 3 and the resistor 4 for the duration $t_2$. FIG. 2*b*. The magnitude of the current being defined by the net forward voltage, i.e., $V-v-\psi$, where $\psi$ is the diode barrier potential. On the termination of the applied pulse, reverse current, defined by $v+\psi$ and the resistor 4, flows for time $t_1$. Charge is conserved, and area $A_1$=area $A_2$.

The $t_2$ is linearly related to the amplitude of the forward current through the diode. Forward current will not be linearly related to the signal voltage at the input to the converter due to the net reverse voltage, $v+\psi$ and the high resistance of the diode, relative to 50 ohms, at low forward currents. However, for the higher range of applied voltage the incremental resistance of the circuit is constant at 50 ohms. This is illustrated in FIG. 3 which shows a current-voltage plot for a step recovery diode. Clearly, the plot is linear for currents above 4 ma.

FIG. 3 further illustrates the forward current-output pulse width characteristic for the same step recovery diode over the range 0–40 ma. The drive pulse for this measure was 12 ns. (nanoseconds) in duration and no external bias was applied. The fact that this graph does not go through the orgin is not fully understood. A systematic measuring error may be responsible or, more likely, the driving waveform is distorted.

From the combined characteristics of FIG. 3 it is evident that over the range 0.9 v. to 2.8 v. the input signal level is linearly related to the output pulse width, the latter varying between 13 and 72 ns. The restriction in the value of the lower limit of the input signal means that the sampling of the information signal must be taken from a level 0.9 volt below that normally used. This is a minor restriction as the sampling reference level is usually arbitrary.

The converter is exceptionally versatile as the reverse bias, series resistance, and drive pulse width can be adjusted to suit the particular application. In a practical PWM system the first basic parameter to be defined is the sampling rate. This fixes the time scale at the converter output. At the input to the converter there will be a preferred operating range depending on the amplitude of the information signal. This operating range will fix the drive pulse width for the required output time scale. For example, scaling the measured data given in the last paragraph, a 6 ns. pulse would give an input range of 0.9 to 4.8 volts, and a 2 ns. pulse a range of 0.9 to 12.8 volts, for the same output time scale.

Application of reverse bias increase the reverse current but requires appropriate further correction of the reference level for the sampling process. The resistance is probably the most restricted parameter as for fast pulse work its value should not depart greatly from the line impedance.

It is to be understood that the foregoing description of specific examples of this invention is not to be considered as a limitation of its scope.

What we claim is:

1. A pulse amplitude modulation to pulse width modulation converter comprising:

a source of pulse amplitude modulation signal;

a series circuit coupled to said source including a step recovery diode and a resistor; means reverse biasing said diode; and a pair of output terminals coupled across said resistor to remove a pulse width modulation signal therefrom having a width proportional to the amplitude of said pulse amplitude modulation signal.

2. A converter according to claim 1, further including a coaxial line having a center conductor and an outer conductor; and said diode is inserted in said center conductor and said resistor is connected between said center conductor and said outer conductor.

3. A converter according to claim 2, wherein said resistor is a disk resistor.

4. A pulse amplitude modulation to pulse width modulation converter wherein comprising:

a pair of input terminals;

a series circuit coupled between said input terminals including a step recovery diode and a resistor; means reverse biasing said diode;

a pair of output terminals coupled across said resistor; and a coaxial line having a center conductor and an outer conductor;

said diode being inserted in said center conductor and said resistor being connected between said center conductor and said outer conductor;

the value of the ohmic resistance of said resistor matching the value of the characteristic impedance of said coaxial line.

5. A converter according to claim 4, wherein said resistor is a disk resistor.

6. A converter according to claim 4, further including a coaxial line having a center conductor and an outer conductor; and said diode is inserted in said center conductor and said resistor is connected between said center conductor and said outer conductor.

7. A converter according to claim 4, wherein said resistor is a disk resistor.

8. A pulse amplitude modulation to pulse width modulation converter comprising:

a pair of input terminals;

a series circuit coupled between said input terminals including a step recovery diode and a resistor;

a pair of output terminals coupled across said resistor;

means coupled to said diode to apply a reverse bias voltage to said diode; and a coaxial line having a center conductor and an outer conductor;

said diode being inserted in said center conductor and said resistor being connected between said center conductor and said outer conductor;

the value of the ohmic resistance of said resistor matching the value of the characteristic impedance of said coaxial line.

9. A converter according to claim 8, wherein said resistor is a disk resistor.

References Cited

UNITED STATES PATENTS

| | | | |
|---|---|---|---|
| 3,191,125 | 6/1965 | Hunton et al. | 329—162 |
| 3,292,006 | 12/1966 | Candy et al. | 307—88.5 |
| 3,299,294 | 1/1967 | Koehler | 307—88.5 |

OTHER REFERENCES

Abbott et al.: "Diode Amplifiers—Solid State Circuit Conference 1958," February 1958, pp. 57–59, Lib. Nos. TK7872, T73, T65.

ALFRED L. BRODY, *Primary Examiner.*

U.S. Cl. X.R.

329—162, 205; 307—319, 320, 265, 234